United States Patent [19]

Riedel et al.

[11] Patent Number: 5,294,574
[45] Date of Patent: Mar. 15, 1994

[54] PRODUCTION OF NONOXIDE MONOLITHIC CERAMIC SHAPED ARTICLES

[75] Inventors: Ralf Riedel, Leinf.-Echterd; Gerd Passing, Wermelskirchen; Richard J. Brook, Stuttgart, all of Fed. Rep. of Germany; Christian Colombier, Lyons, France; Maurice Gonon, Saint-Priest, France; Gilbert Fantozzi, Meyzieu, France

[73] Assignees: Elf Atochem S.A., Puteaux, France; Max-Planck-Institut fur Metallforschung, Stuttgart, Fed. Rep. of Germany

[21] Appl. No.: 863,099

[22] Filed: Apr. 3, 1992

[30] Foreign Application Priority Data

Apr. 5, 1991 [FR] France ............... 91 04167

[51] Int. Cl.$^5$ ............................................. C04B 35/54
[52] U.S. Cl. ............................... 501/88; 501/92; 501/96; 264/63

[58] Field of Search ................. 501/88, 89, 92, 96, 501/97, 98; 264/63

[56] References Cited

U.S. PATENT DOCUMENTS

| | | | |
|---|---|---|---|
| 5,006,492 | 4/1992 | Semen et al. | 501/97 |
| 5,145,812 | 9/1992 | Arai et al. | 501/97 |
| 5,145,813 | 9/1992 | Takeda et al. | 501/97 |

*Primary Examiner*—Mark L. Bell
*Assistant Examiner*—A. Wright
*Attorney, Agent, or Firm*—Burns, Doane, Swecker & Mathis

[57] ABSTRACT

Crack-free, dense and either amorphous or crystalline, nonoxide monolithic ceramic shaped articles are produced at relatively low temperatures, by shaping a powder (P) of an infusible, organometallic ceramic precursor polymer (Pi) into a green body having a relative density of at least 65%, and thence pyrolyzing such shaped green body.

18 Claims, No Drawings

PRODUCTION OF NONOXIDE MONOLITHIC CERAMIC SHAPED ARTICLES

BACKGROUND OF THE INVENTION

1. Field of the Invention

The present invention relates to the production of nonoxide monolithic ceramic shaped articles, and, more especially, to the production of such ceramic shaped articles from organometallic precursors.

2. Description of the Prior Art

Nonoxide ceramic materials such as AlN, B₄C, SiC or Si₃N₄ are generally produced at high temperatures (1,700° to 2,500° C.) by sintering under pressure, hot-pressing or hot isostatic pressing of the appropriate ceramic powders containing such additives as are required to improve the densification thereof. This technique presents a number of disadvantages:

(1) Homogeneous distribution of the additives in the powder intended as the matrix is difficult to achieve. Complex grinding processes or wet-phase chemical techniques have been proposed to the art to improve such homogeneity. Nevertheless, the presence of nonhomogeneous regions cannot be avoided and this may result in the formation of cracks in the final product shaped article by reason of nonuniform shrinking of the ceramic during sintering. Because of this, the reproducibility and the reliability of this technique is limited;

(2) Densification of the ceramic requires high temperatures, namely, high energy requirements and concomitant increased costs;

(3) Polycrystalline materials are produced after sintering; however, the interface of the particles considerably limits the physical and mechanical properties of the material, especially at high temperatures.

SUMMARY OF THE INVENTION

Accordingly, a major object of the present invention is the provision of improved process for the production, at low temperatures, of dense ceramic shaped articles, both amorphous and polycrystalline, that are crack-free and have good mechanical properties, by thermally converting appropriate organometallic precursor materials.

Another object of the present invention is the provision of a process for the production of nonoxide ceramic shaped articles, whether amorphous or crystalline, that are dense and monolithic, at relatively low temperatures (for example at temperatures ranging from 800° to 1,100° C.), and either with or without sintering additives, such ceramics containing only an extremely low content of impurities.

Still another object of this invention is the provision of such ceramic shaped articles, per se.

Briefly, the present invention features a process for the production of monolithic nonoxide ceramic shaped articles, comprising:

(a) preparing a powder (P) from an infusible ceramic precursor (Pi);

(b) shaping said powder (P); and (c) pyrolyzing the resulting shaped article to produce a monolithic ceramic shaped article.

DETAILED DESCRIPTION OF THE PREFERRED EMBODIMENTS OF THE INVENTION

More particularly according to the present invention, in one preferred embodiment thereof, the powder (P) is shaped during the second step (b) in admixture with a fusible organometallic precursor (Po) which is liquid under the conditions of such shaping.

In another embodiment of this invention, the article produced by the shaping in step (b) is subjected, before pyrolysis, to conditions effecting the crosslinking of the precursor (Po) into an infusible precursor (Pi).

In yet another embodiment of this invention, the shaped article comprising the crosslinked precursor (Pi) as indicated above, is again impregnated with a precursor (Po) in liquid form.

The first step in the process of the invention entails providing a powder from an infusible ceramic precursor (Pi). This precursor itself may be prepared by the crosslinking of an initially fusible organometallic precursor (Po), or may be obtained directly in crosslinked form.

Such fusible precursors may be selected from among a very wide range of organometallic polymers comprising Al, B or Si, and C or N or O, or mixtures thereof, in the polymer chain. Particularly exemplary such organometallic precursors (Po) include:

(i) the polysilazanes of the formula:

(ii) the polysilylhydrazines of the formula:

(iii) the polysilanes of the formula:

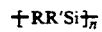

(iv) the polycarbosilanes of the formula:

in which formulae the symbols R and R' are each a hydrogen atom or an alkyl, alkenyl, alkynyl or aryl radical having up to 12 carbon atoms. The symbols R and R' in the above formulae are preferably each a hydrogen atom, a vinyl radical or a methyl radical.

The conversion of the precursor (Po) into the infusible polymer (Pi) can be carried out by various techniques and especially by chemical, thermal or physical crosslinking, it being possible for the crosslinking temperature to range from room temperature to approximately 750° C., depending on the circumstances. Chemical crosslinking can, in particular, be effected by means of reactive substituents in the polymer structure, such as metal-hydrogen (for example SiH) or —NH or vinyl or acetylenyl groups.

As indicated above, it is also possible to begin with a precursor exhibiting a more or less advanced degree of crosslinking as soon as it is prepared, as is the case, for example, with polymethylvinylsilane, which can be prepared in an already crosslinked form by reacting methylvinyldichlorosilane with Na/K.

In one embodiment of the step (a) according to this invention, when beginning with a fusible precursor (Po), it is possible, before conversion of said precursor (Po), to mix it with a sintering additive (as described in published German Patent Application No. 3,840,773) to obtain completely dense shaped articles during the subsequent heat treatments carried out above the temperature of pyrolysis.

The powder (P) may be obtained by grinding the polymer (Pi), optionally in a mill containing ZrO$_2$ media. The powder (P) advantageously has a particle size ranging from 0.1 to 500 μm, with the average particle size advantageously ranging from 2 to 100 μm.

The step (b) of the process of the invention entails shaping an article from the powder (P), or from a mixture comprising such powder (P) and a precursor (Po).

This shaping can be carried out, for example, by isostatic or uniaxial pressing, generally without heating, or else by extrusion or by injection molding. It is thus generally possible to obtain a raw ("green") article, namely, having, before pyrolysis, a relative density representing at least 65% and preferably at least 75% of the density of a polymer which is completely free of any porosity.

It is also possible to carry out this shaping by the sol/gel technique, from polymers (Pi) dissolved in an organic solvent, for example tetrahydrofuran or toluene, and then gelled thermally or chemically, for example by adding ammonia, or physically, for example by means of ultraviolet radiation.

The pores of the articles thus produced typically have an average diameter which is smaller than 200 nm, the distribution of the pore volume indicating that most of the pores have a diameter smaller than 4 nm.

As indicated above and in another embodiment of the invention, the shaping can also be carried out beginning with a mixture comprising the infusible polymer powder (Pi) and a precursor (Po).

This precursor (Po) may be selected from among the fusible precursors described above. Such precursor may be liquid or solid at room temperature. In the latter event, it is desirable that the precursor (Po) should become fluid at a moderate temperature, for example below 300° C., to facilitate the shaping operation and that, at the shaping temperature, which, depending upon the particular circumstances, can therefore range from room temperature to a temperature on the order of 300° C. It should have a viscosity which is preferably lower than 10$^6$ poises The quantity of precursor (Po) added to the infusible precursor (Pi) may vary over wide limits. However, for reasons of ease of handling of the article shaped from the mixture of (Pi)+(Po), it is desirable that the quantity of (Po) should not exceed 25% of the weight of the mixture of (Pi)+(Po), it being understood that this indication is provided strictly by way of example only, since other parameters may intervene, such as, for example, the particle size and/or the surface area of the polymer powder (Pi).

The article resulting from the shaping of the powder (P) or of the mixture of powder (P) +precursor (Po) may be subjected directly to pyrolysis.

It is also possible to crosslink the precursor (Po), for example by heating the shaped article to a temperature ranging from approximately 300° C. to approximately 750° C.

It is also envisaged to reimpregnate the shaped article with a precursor (Po) in the liquid state under appropriate conditions of reimpregnation.

In the several embodiments indicated above, the final step (c) entails pyrolysis of the shaped article.

This pyrolysis is advantageously conducted under argon or nitrogen, or else under NH$_3$ if it is desired to remove carbon from the precursor while replacing it with nitrogen, at a temperature which ranges from 500° to 1200° C. It is advantageous to heat the article progressively from 100° to 950° C., for example at a rate of 1° C. per minute, and then to reheat for 1 hour at 950° C. at atmospheric pressure or under vacuum.

The polymer powder particles are thus converted into dense ceramic particles which are nonporous as a result of a shrinkage on the order of 20% to 25%, the final product shaped articles being dense, devoid of cracks and amorphous to X-rays.

Without wishing to be bound to or by any particular theory, the good mechanical strength may be attributed to the formation of covalent bonds between the polymer powder particles formed during the pyrolysis. No macroscopic cracks are observed, and scanning electron microscopy does not detect any pores larger than 20 μm in the final monolithic ceramic shaped articles.

The porosity of the final monolithic ceramic shaped article typically does not exceed 25% and a majority of the pores (more than 50%) have a diameter on the order of 100 to 500 nm.

The aforesaid shaped articles can be crystallized by heat treatment, for example at a temperature on the order of 1,300° to 1,700° C. In the case of amorphous SiC monoliths, it is thus possible to obtain α-SiC or β-SiC or a mixture of both crystalline forms. In like manner, α-Si$_3$N$_4$ or β-Si$_3$N$_4$ or a mixture of the two can be produced from amorphous Si$_3$N$_4$.

In order to further illustrate the present invention and the advantages thereof, the following specific examples are given, it being understood that same are intended only as illustrative and in nowise limitative.

EXAMPLE 1

4 g of polysilazane NCP 200 (Nichimen Corporation, Japan), placed in a quartz tube, were heated to 400° C. at the rate of 5° C./min, under an argon atmosphere. At 120° C. the polysilazane melted and remained in the liquid state until the beginning of thermal polymerization, namely, at about 400° C.; the material was thus converted into an infusible preceramic polysilazane, slightly soluble in toluene, tetrahydrofuran and n-hexane. After 5 min of heating at 400° C. the residue was cooled to room temperature. The loss in weight was 3.5%.

EXAMPLE 2

42 g of polysilazane NCP 200 were heated in a quartz tube up to 400° C. at the rate of 13° C./min under argon. The polysilazane melted at 120° C. and remained in the liquid state until thermal polymerization was initiated at 400° C. Heating of the crosslinked polysilazane at 400° C. for 1 hour under argon and then for 2 hours in vacuum (3×10$^{-3}$ mbar) resulted in the evaporation of low molecular weight species and in the conversion of the polysilazane into an infusible material insoluble in toluene, THF or n-hexane. After cooling to room temperature, it was found that the loss in weight was 8.3%. A density of 1,220 kg m$^{-3}$ was determined for this crosslinked polysilazane using a pycnometer.

EXAMPLE 3

The crosslinked and infusible polysilazane produced according to Example 1 was pelleted in a uniaxial press. The molded polysilazane shaped article (6 mm in diameter and 10 mm in height) was then pyrolyzed with a temperature increase of 1° C./min up to 950° C. and was maintained at this temperature for 1 hour. This treatment resulted in a loss in weight of 29%. The article obtained was free from cracks and had a relative density of 85%.

Examination of the microstructure evidenced that the starting polymer particles gave rise, on pyrolysis, to a continuous network of silicon carbonitride by forming strong interconnections between the particles. No porosity was detected within the large ceramic particles produced.

EXAMPLE 4

The polysilazane prepared according to Example 2 was ground and then passed through a 140-$\mu$m screen. The particles exhibited sizes smaller than 60 $\mu$m and an average diameter of 8 $\mu$m. This polymer powder was then molded by cold isostatic pressing t 640 MPa into a cylinder 14 mm in height and 14 mm in diameter. Its density in the raw state was 1,026 kg m$^{-3}$, namely, 84% of the theoretical maximum density. The molded shaped article exhibited excellent mechanical behavior. It was pyrolyzed under the same conditions as in Example 3 and a monolithic article free from visible cracks was thus produced. During the pyrolysis, the linear shrinkage was 25% and the loss in mass 23%.

The article obtained had a density of 1,992 kg m$^{-3}$, which corresponded to 87% of the maximum theoretical density of 2,280 kg m$^{-3}$, which was determined using a pycnometer. The microstructure was a continuous network of an amorphous siicon carbonitride phase with an open porosity of 12% (mercury porosity). No other phase was detected between the ceramic particles.

EXAMPLE 5

Repeating the technique described in Example 4, a polysilazane body 22×14×69 mm in size was pressed cold isostatically at 640 MPa and was pyrolyzed under the conditions of Example 3. The density of the pyrolyzed monolithic sample, free from visible cracks, was 75% of theory. It was cut into small bars to make it possible to measure its mechanical properties. The 4-point flexural strength was approximately 150 MPa. Maximum values of 370 MPa were obtained in isolated cases.

EXAMPLE 6

Following the procedure of Example 4, the crosslinked polysilazane powder was pressed cold and isostatically at 640 MPa into a cylinder 14 mm in height and 14 mm in diameter. It was then pyrolyzed up to 950° C. under a reactive ammonia atmosphere and a monolithic sample of pure, crack-free Si$_3$N$_4$ was thus produced. The loss in weight of the article on pyrolysis was 23%.

EXAMPLES 7 TO 10

The fusible precursor was a polysilazane marketed by ATOCHEM under the registered trademark Pyrofine PV ®. Its relative density was approximately 1 at room temperature. Its viscosity was approximately 13 poises at 50° C. and 0.2 poises at 150° C.

This precursor was crosslinked by heating to 300° C. (rate of temperature increase: 5° C./h) and was then maintained at this temperature for 1 hour. After cooling, the crosslinked polymer was ground under a nitrogen atmosphere. The powder obtained had a relative density of 1.13 and a specific surface area of 10 m$^2$/g.

The powder/liquid precursor mixture was prepared by mixing the selected quantities of the two products and adding a quantity of toluene equivalent to the mass of the above-mentioned mixture. The toluene was evaporated off at 80° C. under progressive vacuum and the resulting mixture was maintained at 80° C. at 5 mbar for 1 h, 30 min.

EXAMPLE 7

A powder/liquid mixture was prepared as described above, in the proportion of 15% by weight of liquid and 85% by weight of powder.

This mixture was compressed at 150 MPa and a molded shaped article was thus produced.

This article was placed in a furnace and pyrolysis was carried out with nitrogen purging, with the following temperature profile:
 (i) 100° C./h up to 130° C.,
 (ii) 5° C./h from 130° to 300° C.,
 (iii) 50° C./h from 300° to 1,000° C.,
 (iv) plateau of 2 h at 1,000° C.

A black ceramic article was thus produced without any visible crack and having dimensions which were substantially homothetical with the article before pyrolysis. The heat treatment resulted in a volume shrinkage of approximately 60%.

The ceramic article had a total porosity of 25%.

EXAMPLE 8

The procedure of Example 7 was repeated, except that:
 (a) a mixture of 20% by weight of liquid precursor and 80% by weight of crosslinked powder was employed;
 (b) during the heat treatment of the article, the nitrogen purging was stopped from 225° C. and higher and a nitrogen pressure of 10 bars was applied instead.

When the temperature reached 300° C., the nitrogen purging was reestablished at atmospheric pressure.

A black ceramic article was produced without any visible crack and having dimensions which were substantially homothetical with the article before pyrolysis.

This article had a total porosity of 21%.

EXAMPLE 9

A mixture was prepared as described above with 5% by weight of liquid precursor and 95% by weight of crosslinked powder.

After shaping under pressure as described above, a heat treatment of the molded shaped article was carried out under nitrogen purging at atmospheric pressure, according to the following temperature profile:
 (i) 100° C./h up to 130° C.,
 (ii) 5° C./h from 130° to 300° C.,
 (iii) plateau of 1 h at 300° C.

An article which exhibited sufficient consistency to be handled and which no longer "sticks" as before the chemical treatment was thus produced.

This article was then impregnated with pure Pyrofine PV ® at 150° C. at 150 bars for 2 hours.

The impregnated article was then pyrolyzed under nitrogen purging according to the following temperature profile:
 (i) 100° C./h up to 130° C.,
 (ii) 5° C./h from 130° to 300° C.,
 (iii) 50° C./h from 300° to 1,000° C.,
 (iv) plateau of 2 h at 1,000° C.

A black ceramic article was thus produced without any visible crack and having dimensions which were substantially homothetical with the articles before pyrolysis.

The ceramic article had a total porosity of 15%.

EXAMPLE 10 Comparative

Approximately 2 cm$^3$ of Pyrofine PV ® were poured into a quartz tube of $\phi \approx 1$ cm and a pyrolysis was carried out according to the following temperature profile:
 (i) 100° C./h up to 130° C.,
 (ii) 5° C./h from 130° to 300° C.,
 (iii) 50° C./h from 300° to 1,000° C.,
 (iv) plateau of 2 h at 1,000° C.

A brittle black ceramic was thus produced, exhibiting defects which were obvious to the naked eye and having a total porosity of 53%.

This clearly demonstrated the advantages of the invention as shown by the preceding examples.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a crack-free, dense and amorphous, nonoxide monolithic ceramic shaped article, comprising shaping a powder (P) of an infusible, organometallic ceramic precursor polymer (Pi) into a green body having a relative density of at least 65%, and thence pyrolyzing said shaped green body.

2. The process as defined by claim 1, said powder (P) further comprising a fusible organometallic precursor polymer (Po) that is in liquid state under the conditions of shaping.

3. The process as defined by claim 2, comprising crosslinking said precursor polymer (Po) prior to pyrolysis of said shaped green body.

4. The process as defined by claim 1, further comprising impregnating said shaped green body with a fusible organometallic precursor polymer (Po) that is in liquid state prior to the pyrolysis thereof.

5. The process as defined by claim 2, comprising impregnating said shaped green body with a fusible organometallic precursor polymer (Po) that is in liquid state prior to the pyrolysis thereof.

6. The process as defined by claim 1, said infusible precursor polymer (Pi) comprising at least one of Al, B and Si atoms and at least one of C and N atoms.

7. The process as defined by claim 2, said fusible precursor polymer (Po) comprising at least one of Al, B and Si atoms and at least one of C and N atoms.

8. The process as defined by claim 1, said infusible precursor polymer (Pi) comprising a polysilazane, polysilylhydrazine, polysilane or polycarbosilane.

9. The process as defined by claim 2, said fusible precursor polymer (Po) comprising a polysilazane, polysilylhydrazine, polysilane or polycarbosilane.

10. The process as defined by claim 1, said powder (P) having a particle size ranging from 0.1 to 500 μm.

11. The process as defined by claim 10, said powder (P) having an average particle size ranging from 2 to 100 μm.

12. The process as defined by claim 2, wherein the amount of said fusible precursor polymer (Po) comprises not more than 25% by weight of the total amount of the mixture (Pi)+(Po).

13. The process as defined by claim 3, comprising thermally crosslinking said precursor polymer (Po).

14. The process as defined by claim 1, comprising pyrolyzing said shaped green body at a temperature ranging from 500° C. to 1,200° C.

15. The process as defined by claim 1, said green body having a relative density of at least 75%.

16. The process as defined by claim 1, further comprising thermally crystallizing said pyrolyzed shaped article.

17. The process as defined by claim 1, wherein the shaping step is performed by compressing a powder (P) consisting essentially of the infusible, organometallic ceramic precursor polymer (Pi).

18. The process as defined by claim 1, wherein the shaping step is performed by compressing a powder (P) consisting essentially of the infusible, organometallic ceramic precursor polymer (Pi) and the fusible organometallic precursor polymer (Po).

* * * * *